Patented Feb. 7, 1950

2,497,045

UNITED STATES PATENT OFFICE 2,497,045

POLYVINYL RESIN DISPERSIONS

Robert B. Killingsworth, Douglaston, and Robert S. Sheie, West Brighton, N. Y., assignors to Socony-Vacuum Oil Company, Incorporated, a corporation of New York No Drawing. Application April 16, 1947, Serial No. 741,948

6 Claims. (Cl. 260—33.6)

This invention relates to liquid or semi-liquid dispersions of resins in hydrocarbon oil plasticizers which are capable of being converted into finished plastics by mere heating to the point of mutual solubility. Specifically it relates to vinyl resin-aromatic petroleum oil compositions.

In the art of finishing pliable textiles with water-proofing and decorative coatings, the earliest method consisted in applying solutions of rubber, soft resins, plasticized resins, metal soaps, and other film-forming plastic materials in appropriate volatile solvents. The evaporation of the solvent is of course a time consuming, costly and hazardous part of manufacturing procedure. With the advent of newer synthetic resins it became necessary to use expensive organic plasticizers and solvents. In order to increase the fluidity of the coating compounds, without the use of excessive amounts of solvents, it has been proposed to commingle a finely powdered resin with the vehicle (plasticizer and thinner) at a temperature below that required for dissolving the resin. The slurry so obtained has a sufficient degree of fluidity to be applied to fabrics by the knife-coating, roll coating, wet extrusion and similar methods. Upon exposure to heat, the solvent evaporates, the resin and plasticizer fuse together and form a tough flexible film. Vinyl chloride polymers and other co-polymers with vinyl chloride and vinyl acetate have received particularly wide application in this field. For plasticizers, to the best of our knowledge, only esters have been used, e. g. dioctyl-phthalate, tri-cresyl phosphate and the like. These ester type plasticizers are quite expensive. As far as the solvents are concerned, it is necessary to use the more expensive aromatic solvents of high solvent power, such as highly aromatic petroleum solvents or coal tar solvents. Vinylite resin organosols of the Carbide Carbon Chemical Co. are representative of such three-component coating compounds. A further step forward has been made during the last few months in the usage of these versatile polyvinyl materials by the introduction of "plastisols." "Plastisol" is a term adapted by the art to designate a colloidal dispersion of vinyl polymers or co-polymers in plasticizers, without the use of volatile thinners (solvents). The advantage of the "plastisol" over its predecessor organosol is obvious. The use of expensive hazardous solvents is eliminated. "Plastisols" also make possible the casting in any thickness with the use of little or no pressure.

A "plastisol" may be further described as a material which contains uniform, spherical particles of resin, less than one micron in diameter, suspended in the plasticizer. Stability is obtained by virtue of the small particle size, and a properly compounded product may be safely handled and stored without danger of separation. A small amount of dispersing agent aids in the compounding. A stabilizer is also added during the curing operation. Upon heating, the vinyl chloride polymer has a slight tendency to decompose with generation of small amounts of hydrochloric acid, and lead compounds have been the favorite stabilizing agent.

The outstanding property of a "plastisol" is its ability to form a clear, coherent film by the application of heat. The plasticizer and resin fuse together at temperatures between 300 and 360° F., while at temperatures up to 100° F. no change occurs. In the formation of films of this type, the nature and amount of plasticizer determine the flexibility, and this in turn varies with the properties desired in the finished product. When a strong continuous film is formed by heat, the milky appearance of the compound disappears, and it becomes transparent indicating continuity of structure. The length of the heat treatment which will produce desired properties in the film, varies with the thickness of the deposit and the kind of base material on which the coating is applied. When no textile is used, an unsupported flexible plastic sheeting may be produced. Compounding techniques with plastisols are quite simple. Plasticizers, extending pigments, stabilizer and colors are added to the dry resin and dispersed by means of suitable grinding equipment, for instance, ball mills or three-roll mills. The latter are preferred because a better temperature control is possible and the milling time is shorter.

This invention is based upon the discovery that aromatic oils such as produced by catalytic cracking of petroleum distillates and finished to a proper boiling range and color, can be successfully employed as plasticizers in plastisols. Such aromatic, purely hydrocarbon oils are available in large commercial quantities and at prices much lower than those of the ester type plasticizers.

It is an object of this invention to provide as plastisols dispersions of polyvinyl resins in aromatic oils of petroleum origin.

As an example of the kind of petroleum oil fraction with which this invention is concerned there may be cited the following:

| | |
|---|---|
| Gravity, °API | 2.0 |
| Flash, COC, °F. | 320 |
| Pour point, °F. | −10 |
| S. U. V. @ 100° F. | 130″ |
| Color | Straw yellow |
| Mixed aniline point, °F. | 65 |
| Boiling range, ASTM, °F. | 580–760 |
| Percent aromatics | 100 |

Plastisols were prepared from Vinylite resin (copolymers of vinyl chloride and vinyl acetate) and our novel oil plasticizer; also from Geon 101 (polymer of vinyl chloride) and the novel plasticizer.

| Example I.—Plastisol for Coating Using Novel Oil Plasticizer | | Example II.—Plastisol for Molding Using Novel Oil Plasticizer | |
|---|---|---|---|
| | Wt. parts | | Wt. parts |
| Aromatic Oil | 55 | Aromatic Oil | 40 |
| Resin VYNV | 45 | Geon 101 | 60 |
| Dispersing Agent [1] | 3 | Dispersing Agent [1] | 3 |
| Total | 103 | Total | 103 |
| Cone Penetration (30 gram load, 5 sec.) | 252 | Cone Penetration (30 gram load, 5 sec.) | 100 |

| Example III.—Plastisol for Coating Using Conventional Dioctyl Phthalate (DOP) | | Example IV.—Plastisol for Molding Using Conventional Dioctyl Phthalate (DOP) | |
|---|---|---|---|
| | Wt. parts | | |
| DOP | 50 | DOP | |
| Resin VYNV | 50 | Geon 101 | [2] |
| Dispersing Agent [1] | 3 | Dispersing Agent [1] | |
| Total | 103 | | |
| Cone Penetration (30 gram load, 5 sec.) | 280 | | |

[1] Dibasic lead stearate.
[2] No Plastisol can be made from these components so as to match the finished molded article derived from Plastisol of Example III.

The material "Resin VYNV" of the above table is a vinyl chloride-vinyl acetate copolymer of the following approximate composition and character.

| | |
|---|---|
| Vinyl chloride | 95% (wt.). |
| Vinyl acetate | less than 5% (wt.) |
| Intrinsic viscosity (in cyclohexanone @ 20° C.) | 1.53 |
| Specific gravity | 1.39 |

The material "Geon 101" of the above table is a polymer of vinyl chloride of the following character.

| | |
|---|---|
| Specific gravity | 1.40 |
| Av. spec. viscosity 0.4% solution in nitrobenzene at 20° C. | .55 |

The above formulations were prepared in a three roll mill provided with water cooled rolls so as not to exceed a temperature of 100° F. Upon curing at 325°, finished articles with the following properties were obtained.

TABLE I

*Properties of finished articles*

| Example | IA | IIIA | IIA |
|---|---|---|---|
| Tensile Strength, lbs./sq. in | 725 | 810 | 1,040 |
| Percent Ultimate elongation | 400 | 370 | 100 |
| Stiffness in Flexure lbs./sq. in. (ASTM D 747-43 T) | 81 | 126 | 297 |

A comparative study of Examples I and III shows that a plastisol of the same working consistency can be produced with less vinyl resin when the novel aromatic oil is substituted for the conventional ester plasticizer. In fact, the plastisol of Example I, with 45% resin VYNV, has a cone penetration of 225 while the plastisol of Example III, with 50% of the same resin, was somewhat softer (penetration 200). Hence, the economic advantages of using the novel aromatic oil as a replacement of dioctyl phthalate, or of similar plasticizers, lie not only in the cheapness of the new plasticizer, but also in the saving of resin.

It should be emphasized that the introduction of the hydrocarbon oil plasticizer is not associated with a lower quality of the finished coatings. Examples IA and IIIA show about the same mechanical properties for unsupported finished sheetings derived from curing plastisols of Examples I and III, respectively.

A comparison of Examples II and IV illustrates the fact that hard molded articles can be produced from oil plastisols but cannot be made from ester plastisols. So much resin is required in a resin-ester finished article to make it rigid, that no plastisol, i. e. a material of dough-like consistency, can be prepared by cold mixing the ingredients in a ratio barely sufficient for wetting the solids with the liquid. Thus, the novel oil plasticizer opens a new field of application of thermoplastic resins of the vinyl group to nonpressure molding of precisely shaped intricate articles, such as toy animals, dolls, medical gadgets, etc.

Example IIA tabulates the mechanical properties of a molding produced by curing of the oil plastisol of Example II. They resemble the properties of rubber.

The physical and chemical characteristics of the hydrocarbon oil used in the experiments described above are typical, but not restrictive for the oil. Based on experience an oil lying within the following ranges may be used.

TABLE II

| Property | Test Method | Value |
|---|---|---|
| Gravity, °API | ASTM D287-39 | 16 max. |
| Distillation | ASTM D158-41 | |
| Initial Boiling Pt., °F | | 500 min. |
| Final Boiling Pt., °F | | 900 max. |
| Mixed Aniline Pt | ASTM D611-44T | 80 max. |
| Unsulfonated Residue, percent | ASTM D483-40 | 20 max. |
| Flash Point, °F | ASTM D92-45 | 300 min. |

Dependent upon the type of use to which the dispersion is to be put, and somewhat upon the nature of the oil and of the resin, the ratio of oil to resin in dispersions of this type may range from about 30 oil/70 resin to about 65 oil/35 resin, by weight.

It is of importance to note that the particle size of the resin is of importance in the formulation of these dispersions. Many vinyl resins are available in fine powder form with particles as small as 1 micron, while coarser resins, such as Geon 101, are presently found to have particles ranging up to about 100 micron. This latter size appears at present to be at about the upper borderline for proper dispersion. In general, any solid thermoplastic vinyl resin prepared to at least 100 micron size will be found to be capable of fusing with the oil into a stable continuous phase.

We claim:
1. An improved resin dispersion, capable of being fused upon heating into a stable, continu- ous phase, comprising a solid thermoplastic vinyl resin of particle size not greater than 100 microns, dispersed in a petroleum hydrocarbon oil, the proportions falling in the range from 30 oil to 70 resin to 65 oil to 35 resin, both inclusive, both by weight, the oil having the following properties:

| | |
|---|---|
| Gravity | 2° to 16° API |
| Distillation: | |
|    I. B. P. | 500° F. to 600° F. |
|    E. P. | 700° F. to 900° F. |
| Mixed aniline point | 60° F. to 80° F. |
| Unsulphonated residue | 0% to 20% |
| Flash point | 300° F. to 350° F. |

2. An improved resin dispersion, capable of being fused upon heating into a stable, continuous phase, comprising a solid thermoplastic polyvinyl chloride resin of particle size not greater than 100 microns, dispersed in a petroleum hydrocarbon oil, the proportions falling in the range from 30 oil to 70 resin to 65 oil to 35 resin, both inclusive, both by weight, the oil having the following properties:

| | |
|---|---|
| Gravity | 2° to 16° API |
| Distillation: | |
|    I. B. P. | 500° F. to 600° F. |
|    E. P. | 700° F. to 900° F. |
| Mixed aniline point | 60° F. to 80° F. |
| Unsulphonated residue | 0% to 20% |
| Flash point | 300° F. to 350° F. |

3. An improved resin dispersion, capable of being fused upon heating into a stable, continuous phase, comprising a solid thermoplastic resinous copolymer of vinyl chloride and vinyl acetate of particle size not greater than 100 microns, dispersed in a petroleum hydrocarbon oil, the proportions falling in the range from 30 oil to 70 resin to 65 oil to 35 resin, both inclusive, both by weight, the oil having the following properties:

| | |
|---|---|
| Gravity | 2° to 16° API |
| Distillation: | |
|    I. B. P. | 500° F. to 600° F. |
|    E. P. | 700° F. to 900° F. |
| Mixed aniline point | 60° F. to 80° F. |
| Unsulphonated residue | 0% to 20% |
| Flash point | 300° F. to 350° F. |

4. An improved resin dispersion, capable of being fused upon heating into a stable, continuous phase, comprising a solid thermoplastic vinyl resin of particle size not greater than 100 microns, dispersed in a petroleum hydrocarbon oil, the proportions falling in the range from 30 oil to 70 resin to 65 oil to 35 resin, both inclusive, both by weight, the oil having the following properties:

| | |
|---|---|
| Gravity, °API | 2 |
| Saybolt Universal viscosity seconds @ 100° F. | 130 |
| Mixed aniline point, °F. | 65 |
| Boiling range, °F. | 580–760 |

5. An improved resin dispersion, capable of being fused upon heating into a stable, continuous phase, comprising a solid thermoplastic polyvinyl chloride resin of particle size not greater than 100 microns, dispersed in a petroleum hydrocarbon oil, the proportions falling in the range from 30 oil to 70 resin to 65 oil to 35 resin, both inclusive, both by weight, the oil having the following properties:

| | |
|---|---|
| Gravity, °API | 2 |
| Saybolt Universal viscosity seconds @ 100° F. | 130 |
| Mixed aniline point, °F. | 65 |
| Boiling range, °F. | 580–760 |

6. An improved resin dispersion, capable of being fused upon heating into a stable, continuous phase, comprising a solid thermoplastic resinous copolymer of vinyl chloride and vinyl acetate of particle size not greater than 100 microns, dispersed in a petroleum hydrocarbon oil, the proportions falling in the range from 30 oil to 70 resin to 65 oil to 35 resin, both inclusive, both by weight, the oil having the following properties:

| | |
|---|---|
| Gravity, °API | 2 |
| Saybolt Universal viscosity seconds @ 100° F. | 130 |
| Mixed aniline point, °F. | 65 |
| Boiling range, °F. | 580–760 |

ROBERT B. KILLINGSWORTH.
ROBERT S. SHEIE.

REFERENCES CITED

The following references are of record in the file of this patent:

UNITED STATES PATENTS

| Number | Name | Date |
|---|---|---|
| 1,436,820 | Plauson | Nov. 28, 1922 |
| 2,431,078 | Powell et al. | Nov. 18, 1947 |